United States Patent
Watanabe et al.

(10) Patent No.: US 10,744,549 B2
(45) Date of Patent: Aug. 18, 2020

(54) METHOD OF VERIFYING OPERATING COMMAND, METHOD OF CONTROLLING MACHINING DEVICE, RECORDING MEDIUM RECORDED WITH OPERATING-COMMAND VERIFICATION PROGRAM, AND OPERATING-COMMAND VERIFICATION SYSTEM

(71) Applicant: KAWASAKI JUKOGYO KABUSHIKI KAISHA, Kobe-shi, Hyogo (JP)

(72) Inventors: Masayuki Watanabe, Kobe (JP); Junichi Kawabata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 416 days.

(21) Appl. No.: 15/555,864

(22) PCT Filed: Feb. 5, 2016

(86) PCT No.: PCT/JP2016/000611
§ 371 (c)(1),
(2) Date: Sep. 5, 2017

(87) PCT Pub. No.: WO2016/139888
PCT Pub. Date: Sep. 9, 2016

(65) Prior Publication Data
US 2018/0043414 A1    Feb. 15, 2018

(30) Foreign Application Priority Data
Mar. 4, 2015 (JP) ................................. 2015-042252

(51) Int. Cl.
*B21D 31/00* (2006.01)
*B21D 22/24* (2006.01)
(Continued)

(52) U.S. Cl.
CPC .............. *B21D 22/24* (2013.01); *B21C 51/00* (2013.01); *B21D 31/005* (2013.01); *G05B 19/18* (2013.01)

(58) Field of Classification Search
CPC ...... B21D 31/005; B21D 22/24; B21C 51/00; G05B 19/18
See application file for complete search history.

(56) References Cited

U.S. PATENT DOCUMENTS

| | | | |
|---|---|---|---|
| 8,302,442 B2* | 11/2012 | Kiridena ................ | B21D 31/00 72/115 |
| 2014/0283571 A1* | 9/2014 | Ren ........................ | B21D 31/00 72/115 |

FOREIGN PATENT DOCUMENTS

JP    H10-137858 A    5/1998

OTHER PUBLICATIONS

Mar. 1, 2016 Search Report issued in International Patent Application No. PCT/JP2016/000611.
(Continued)

*Primary Examiner* — Debra M Sullivan
(74) *Attorney, Agent, or Firm* — Oliff PLC

(57) ABSTRACT

The present disclosure includes calculating coordinates of a midpoint of one of a plurality of first tool teaching points and the subsequent first tool teaching point, and calculating coordinates of a midpoint of one of a plurality of second tool teaching points that corresponds to the one first tool teaching point and the subsequent second tool teaching point, calculating an inter-midpoint distance between the midpoint of the first tool teaching points and the midpoint of the corresponding second tool teaching points, determining whether the inter-midpoint distance is within a given tolerance range, and reporting, when the inter-midpoint distance is out of the (Continued)

given tolerance range, the corresponding first tool teaching points and second tool teaching points as poor.

6 Claims, 5 Drawing Sheets

(51) Int. Cl.
    *G05B 19/18*      (2006.01)
    *B21C 51/00*      (2006.01)

(56) References Cited

OTHER PUBLICATIONS

Sep. 5, 2017 International Preliminary Report on Patentability issued in International Patent Application No. PCT/JP2016/000611.

* cited by examiner

METHOD OF VERIFYING OPERATING COMMAND, METHOD OF CONTROLLING MACHINING DEVICE, RECORDING MEDIUM RECORDED WITH OPERATING-COMMAND VERIFICATION PROGRAM, AND OPERATING-COMMAND VERIFICATION SYSTEM

TECHNICAL FIELD

The present disclosure relates to a method of verifying an operating command, a method of controlling a machining device, a recording medium recorded with an operating-command verification program, and an operating-command verification system.

BACKGROUND ART

As a machining method using a machining device, such as a robot, an incremental forming method has been known in which a workpiece is machined by attaching a bar-like tool (machining jig) to a movable part, such as a robotic arm, and moving a tip-end part of the tool relatively with respect to the workpiece while pressing the tip-end part of the tool against the workpiece (e.g., see Patent Document 1). By using such an incremental forming method, a plate-like workpiece can be fabricated with a high degree of freedom without using a die.

REFERENCE DOCUMENT OF CONVENTIONAL ART

Patent Document

[Patent Document 1] JP1998-137858A

DISCLOSURE

Problems to be Solved by the Present Disclosure

However, in order to carry out complicated machining with high accuracy, it is necessary to additionally bring a jig or a guide plate for exclusive use in contact with a surface of the workpiece opposite from the pressing surface of the tool. As a result, the degree of freedom of machining is lowered.

A method of eliminating the jig or the guide plate for exclusive use may include providing two tools and pressing the two tool against the workpiece from both sides. However, there is a problem that a design of operating commands for simultaneously moving the two tools is difficult. That is, operating command with high machining quality cannot be created only by independently setting teaching points for each tool.

The present disclosure is made in view of the above situations, and aims at providing a method of verifying an operating command, a method of controlling a machining device, and a recording medium recorded with an operating-command verification program, and an operating-command verification system, which are capable of creating an operating command with high machining quality.

SUMMARY OF THE PRESENT DISCLOSURE

A method of verifying an operating command according to one aspect of the present disclosure is provided, the method being for a machining system which includes a machining device configured to perform incremental forming, and a control device configured to control operation of the machining device based on the operating command. The machining device includes a first tool of which a tip-end part is arranged toward a first surface of a plate-like workpiece in a state where the workpiece is disposed at a given location, a first link part configured to hold the first tool and move the first tool with respect to the workpiece, a second tool of which a tip-end part is arranged toward a second surface opposite from the first surface of the workpiece, and a second link part configured to hold the second tool and move the second tool with respect to the workpiece, independently from the first tool. The incremental forming is performed so that the tip-end part of the first tool and the tip-end part of the second tool are pressed against the workpiece. The control device controls operations of the first link part and the second link part based on the operating command containing information on a plurality of first tool teaching points that define a scheduled route of the tip-end part of the first tool, and a plurality of second tool teaching points that are set corresponding to the plurality of first tool teaching points and define a scheduled route of the tip-end part of the second link. The method of verifying the operating command includes determining a teaching point as poor. The determining the teaching point as poor includes calculating coordinates of a midpoint of one of the plurality of first tool teaching points and the subsequent first tool teaching point, and calculating coordinates of a midpoint of one of the plurality of second tool teaching points that corresponds to the one first tool teaching point and the subsequent second tool teaching point, calculating an inter-midpoint distance between the midpoint of the first tool teaching points and the midpoint of the corresponding second tool teaching points, determining whether the inter-midpoint distance is within a given tolerance range, and reporting, when the inter-midpoint distance is out of the tolerance range, the corresponding first tool teaching points and second tool teaching points as poor.

According to the above configuration, it is determined whether the inter-midpoint distance between the midpoint between the two adjacent teaching points among the first tool teaching points, and the midpoint between the two adjacent teaching points and corresponding to the two adjacent first tool teaching points among the second tool teaching points is within the given tolerance range. Thus, it is not only verifiable whether the distance between the teaching point of the first tool and the teaching point of the second tool is set appropriately, but it is also verifiable whether the distance between the entire scheduled route of the first tool and the entire scheduled route of the second tool is set appropriately. Therefore, the operating command with high machining quality can be created.

The scheduled route of the second tool may be defined based on the scheduled route of the first tool. The method of verifying the operating command may include calculating a first tool traveling distance between one of the plurality of first tool teaching points and the subsequent first tool teaching point, and calculating a second tool traveling distance between one of the plurality of second tool teaching points corresponding to the one first tool teaching point and the subsequent second tool teaching point, and comparing the first tool traveling distance with the second tool traveling distance. The determining the teaching point as poor may be performed when the second tool traveling distance is greater than the first tool traveling distance, while the determining the teaching point as poor may not be performed when the second tool traveling distance is less than the first tool traveling distance. According to this, the determining the teaching point as poor is executed for the two adjacent teaching points of which the traveling distance between the teaching points of the second tool is greater than the traveling distance between the teaching points of the first tool. That is, it is verified whether the inter-midpoint distance is set appropriately only for portions where the scheduled route of the second tool which is a subordinate scheduled route of the scheduled route of the first tool makes a large turn around the scheduled route of the first tool. Therefore, the computational complexity and the computation time are reducible by narrowing down the portions to be verified to portions where the distance between the scheduled routes may not fall within the tolerance range, and carrying out the verification of the narrowed-down portions.

The tip-end part of the first tool and the tip-end part of the second tool may be formed in a hemispherical shape, respectively, and the tolerance range is defined based on a radius of the tip-end part of the first tool, a radius of the tip-end part of the second tool, and a plate thickness of the workpiece. According to this, it can be determined easily whether the inter-midpoint distance is a suitable distance when the two tools pinch and press the workpiece therebetween.

A method of controlling a machining device according to another aspect of the present disclosure is based on the operating command verified by the method of verifying the operating command described above.

A recording medium (a non-transitory recording medium) recorded with an operating-command verification program according to another aspect of the present disclosure is provided, the medium being for a machining system which includes a machining device configured to perform incremental forming, and a control device configured to control operation of the machining device based on the operating command. The machining device includes a first tool of which a tip-end part is arranged toward a first surface of a plate-like workpiece in a state where the workpiece is disposed at a given location, a first link part configured to hold the first tool and move the first tool with respect to the workpiece, a second tool of which a tip-end part is arranged toward a second surface opposite from the first surface of the workpiece, and a second link part configured to hold the second tool and move the second tool with respect to the workpiece, independently from the first tool. The incremental forming is performed so that the tip-end part of the first tool and the tip-end part of the second tool are pressed against the workpiece. The control device controls operations of the first link part and the second link part based on the operating command containing information on a plurality of first tool teaching points that define a scheduled route of the tip-end part of the first tool, and a plurality of second tool teaching points that are set corresponding to the plurality of first tool teaching points and define a scheduled route of the tip-end part of the second link. The operating-command verification program causes a computer to execute a teaching point poor determination. The teaching point poor determination includes calculating coordinates of a midpoint of one of the plurality of first tool teaching points and the subsequent first tool teaching point, and calculating coordinates of a midpoint of one of the plurality of second tool teaching points that corresponds to the one first tool teaching point and the subsequent second tool teaching point, calculating an inter-midpoint distance between the midpoint of the first tool teaching points and the midpoint of the corresponding second tool teaching points, determining whether the inter-midpoint distance is within a given tolerance range, and reporting, when the inter-midpoint distance is out of the tolerance range, the corresponding first tool teaching points and second tool teaching points as poor.

An operating-command verification system according to another aspect of the present disclosure is provided, which is configured to verify an operating command used in a machining system comprising a machining device configured to perform incremental forming, and a control device configured to control operation of the machining device based on the operating command. The machining device includes a first tool of which a tip-end part is arranged toward a first surface of a plate-like workpiece in a state where the workpiece is disposed at a given location, a first link part configured to hold the first tool and move the first tool with respect to the workpiece, a second tool of which a tip-end part is arranged toward a second surface opposite from the first surface of the workpiece, and a second link part configured to hold the second tool and move the second tool with respect to the workpiece, independently from the first tool. The incremental forming is performed so that the tip-end part of the first tool and the tip-end part of the second tool are pressed against the workpiece. The control device controls operations of the first link part and the second link part based on the operating command containing information on a plurality of first tool teaching points that define a scheduled route of the tip-end part of the first tool, and a plurality of second tool teaching points that are set corresponding to the plurality of first tool teaching points and define a scheduled route of the tip-end part of the second link. The operating-command verification system causes a computer to execute a teaching point poor determination. The teaching point poor determination includes calculating coordinates of a midpoint of one of the plurality of first tool teaching points and the subsequent first tool teaching point, and calculating coordinates of a midpoint of one of the plurality of second tool teaching points that corresponds to the one first tool teaching point and the subsequent second tool teaching point, calculating an inter-midpoint distance between the midpoint of the first tool teaching points and the midpoint of the corresponding second tool teaching points, determining whether the inter-midpoint distance is within a given tolerance range, and reporting, when the inter-midpoint distance is out of the tolerance range, the corresponding first tool teaching points and second tool teaching points as poor.

The purpose of the present disclosure, other purposes, features, and advantages will be made clear from the following detailed description of a suitable embodiment while referring to the accompanying drawings.

Effect of the Present Disclosure

The present disclosure is configured as described above to provide the effect that the operating command can be created with high machining quality.

MODE FOR CARRYING OUT THE PRESENT DISCLOSURE

Hereinafter, one embodiment of the present disclosure is described with reference to the accompanying drawings. Note that, below, the same or equivalent components are assigned with the same referential characters throughout the drawings to omit redundant description.

Figure 1:
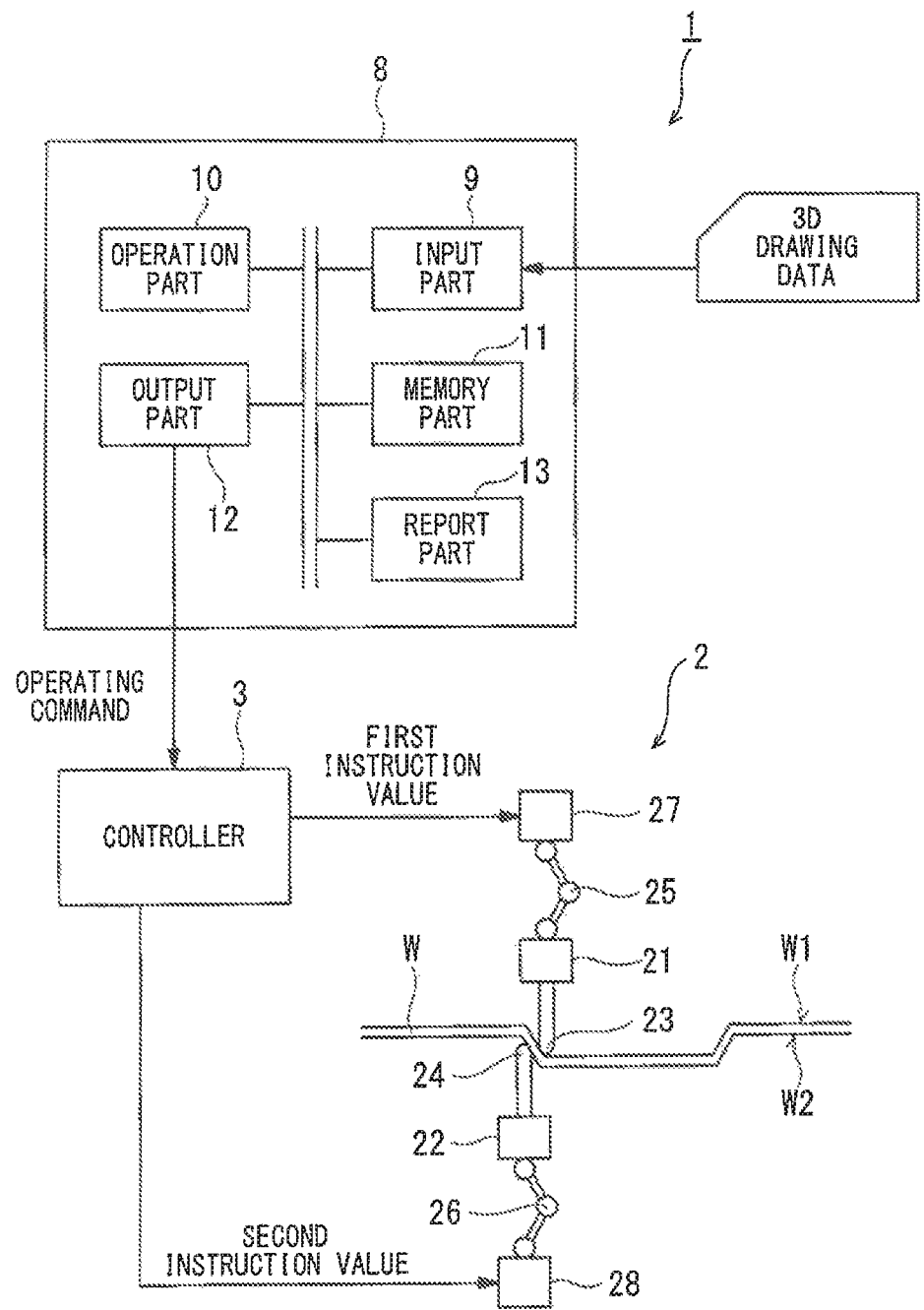
FIG. 1 is a view schematically illustrating a configuration of a machining system including a computer terminal to which a method of verifying an operating command according to one embodiment of the present disclosure is applied.

FIG. 1 is a view schematically illustrating a configuration of a machining system including a computer terminal to which a method of verifying an operating command according to one embodiment of the present disclosure is applied. As illustrated in FIG. 1, the machining system 1 of this embodiment includes a machining device 2, and a controller 3 which is a control device of the machining device 2.

The machining device 2 is configured to carry out incremental forming of a plate-like workpiece W. The machining device 2 may be comprised of a general-purpose robotic device, or may be configured as a device dedicated to machine a given target object to be machined. The machining device 2 includes a first tool 21 and a second tool 22 which are independently operable. The first tool 21 is configured so that a tip-end part 23 thereof is arranged toward a first surface W1 of the plate-like workpiece W in a state where the workpiece W is located at a given location. The second tool 22 is configured so that a tip-end part 24 thereof is arranged toward a second surface W2 of the workpiece W which is opposite from the first surface W1.

An operating command of the machining device 2 is inputted into the controller 3, and stored therein. The controller 3 calculates a first instruction value for the first tool 21 and a second instruction value for the second tool 22 based on the operating command, and controls to independently operate the first tool 21 and the second tool 22 of the machining device 2 by outputting the first instruction value and the second instruction value to the machining device 2.

The first tool 21 and the second tool 22 are constructed as a bar-like machining jig, and each of the tip-end parts 23 and 24 is formed in a hemispherical shape.

The first tool 21 is held by a first link part 25 which moves the first tool 21 with respect to the workpiece W. The first link part 25 is fixed to a first pedestal 27. The second tool 22 is held by a second link part 26 which moves the second tool 22 with respect to the workpiece W, independently from the first tool 21. The second link part 26 is fixed to a second pedestal 28. In FIG. 1, although one example in which each of the link parts 25 and 26 is comprised of an arm having a plurality of joints is illustrated, the shapes and structures of the link parts 25 and 26 are not limited in particular.

Based on the operating command, the controller 3 controls the machining device 2 to sequentially machine (incremental forming) the workpiece W by relatively moving the first tool 21 and the second tool 22 with respect to the workpiece W, while pressing the tip-end part 23 of the first tool 21 against the first surface W1 of the workpiece W and pressing the tip-end part 24 of the second tool 22 against the second surface W2 of the workpiece W.

The operating command may be created from three-dimensional drawing data drawn with a three-dimensional drawing program, such as a 3D-CAD software. Based on an engineering drawing created beforehand by CAD software etc., the three-dimensional drawing data is given with teaching points and various codes for control processing in the controller 3 by using a CAM device or a CAM program.

Figure 2:
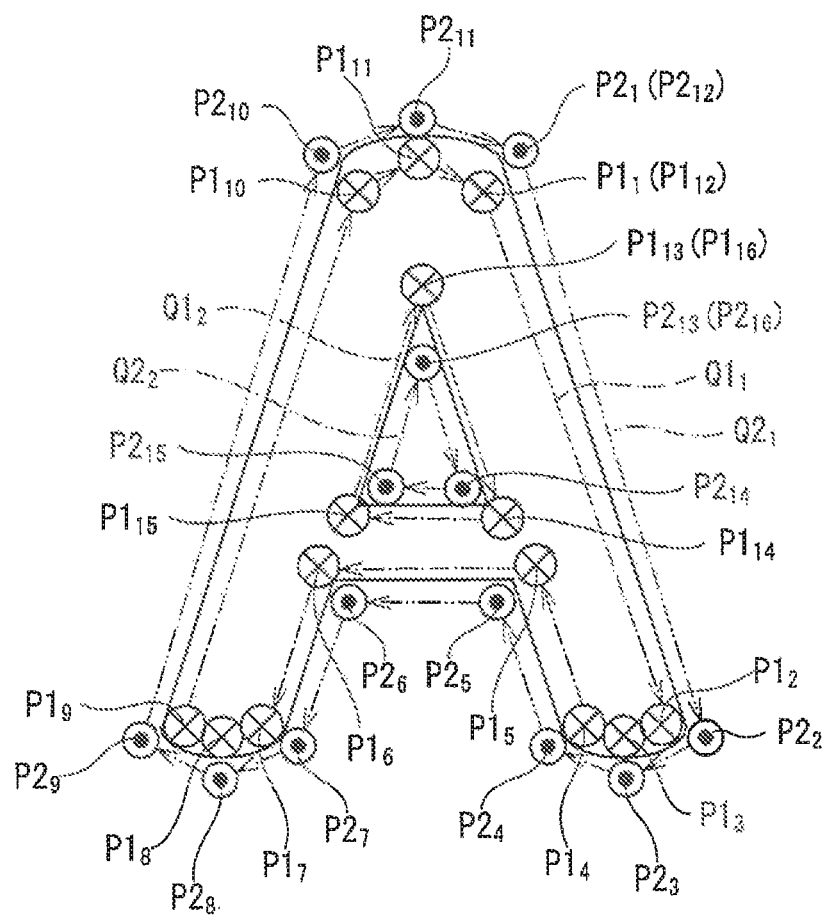
FIG. 2 is a plan view illustrating one example of three-dimensional drawing data inputted into the computer terminal illustrated in FIG. 1.
Figure 3:
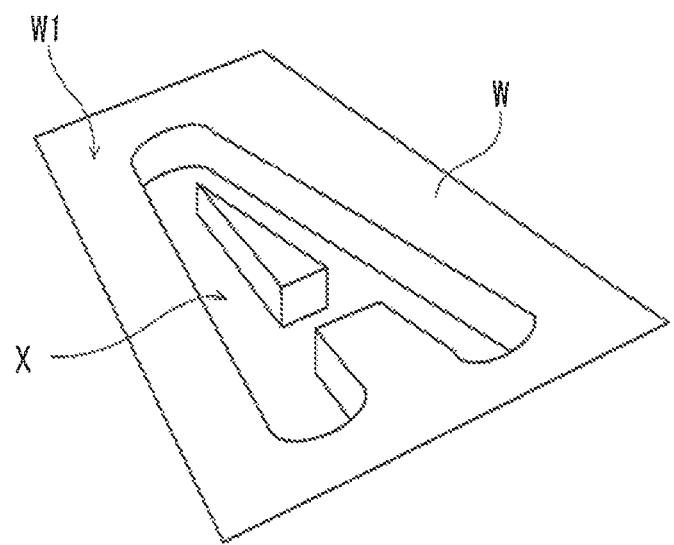
FIG. 3 is a perspective view of a workpiece after being machined based on the three-dimensional drawing data of FIG. 2.

FIG. 2 is a plan view illustrating one example of the three-dimensional drawing data inputted into the computer terminal illustrated in FIG. 1, and FIG. 3 is a perspective view of the workpiece after being machined based on the three-dimensional drawing data of FIG. 2. FIG. 2 is a plan view of the workpiece W seen from the first surface W1. As illustrated in FIGS. 2 and 3, below, it describes based on a mode in which a groove X having an A-character shape of the alphabet is formed in the workpiece W. The groove X has a shape in which the character "A" portion projects toward the second surface W2 from other portions of the workpiece W. In FIG. 2, first tool teaching points $P1_i$ (i=1, 2, 3 . . . ) indicative of passing positions of the tip-end part 23 of the first tool 21, scheduled routes $Q1_m$ (m=1 and 2) on which the tip-end part 23 moves sequentially, second tool teaching points $P2_i$ (the values of "i" corresponds to the values of "i" of $P1_i$ of the first tool teaching points) indicative of passing positions of the tip-end part 24 of the second tool 22, and scheduled routes $Q2_m$ on which the tip-end part 24 moves sequentially, are illustrated.

The computer terminal 8 which creates the operating command includes an input part 9 into which the three-dimensional drawing data is inputted, an operation part 10, such as a CPU, which performs various calculations based on the inputted three-dimensional drawing data, a memory part 11, such as a RAM or an external storage, which stores the calculation results, an output part 12 which outputs the created operating command, and a report part 13 which reports a result of operating-command verification processing described later. The report part 13 is comprised of a display device. The output part 12 of the computer terminal 8 and the controller 3 may be communicatively connected to each other by a wired or wireless fashion, and may be configured so that the operating command is directly inputted into the controller 3 from the output part 12 of the computer terminal 8. Alternatively, the operating command may be outputted as an operating program to a given storage medium (not illustrated) from the output part 12 of the computer terminal 8 and stored it in the storage medium, the stored storage medium may be connected to the controller 3, and the controller 3 may execute the operating program so that the operating command is readable.

The operating command includes the plurality of first tool teaching points $P1_i$ which define the scheduled routes of a work part 4 of the machining device 2, the plurality of second tool teaching points $P2_i$ corresponding to the first tool teaching points $P1_i$, postures of the tools 21 and 22 at the teaching points $P1_i$ and $P2_i$, and speeds of the tools 21 and 22 at the teaching points $P1_i$ and $P2_i$.

Information on each first tool teaching point $P1_i$ includes position coordinates of the tip-end part 23 of the first tool 21 in a given coordinate system. Similarly, the information on each second tool teaching point $P2_i$ includes position coordinates of the tip-end part 24 of the second tool 22 in the given coordinate system. Note that, although the teaching points $P1_i$ and $P2_i$ are indicated so as to be arranged in a plane of FIG. 2, the position coordinates of each teaching point are illustrated as three-dimensional coordinates. That is, the position coordinates of the teaching points $P1_i$ and $P2_i$ also include coordinates in vertical directions of the drawing sheet of FIG. 2.

Moreover, the postures of the tools 21 and 22 are indicated by directions in a tool coordinate system (OAT coordinate system). The computer terminal 8 which creates the operating command converts, based on the three-dimensional drawing data, the coordinates of the teaching points $P1_i$ and $P2_i$ indicated in the three-dimensional drawing data into a robot's coordinate system, and applies, based on the scheduled routes $Q1_m$ and $Q2_m$ of the tools 21 and 22, changes in the postures of the tools 21 and 22 which are patternized beforehand, to set the posture of the first tool 21 at each first tool teaching point $P1_i$ and the posture of the second tool 22 at each second tool teaching point $P2_i$. Alternatively or additionally, the postures of the tools 21 and 22 may be set by manual inputs etc. for the teaching points $P1_i$ and $P2_i$.

Speeds of the tools 21 and 22 are set for each of the teaching points $P1_i$ and $P2_i$ based on the positional change or the posture change of the teaching points $P1_i$ and $P2_i$ which continue (are adjacent) along the scheduled routes $Q1_m$ and $Q2_m$. Further, the speeds of the tools 21 and 22 are set so that a timing at which the tip-end part 23 of the first tool 21 is located at (reaches) a certain first tool teaching point $P1_i$ is in agreement with a timing at which the tip-end part 24 of the second tool 22 is located at (reaches) a second tool teaching point $P2_i$ corresponding to the first tool teaching point $P1_i$.

That is, if a first tool traveling distance $L1_i$ between a certain first tool teaching point $P1_i$ and a teaching point of the subsequent first tool teaching point $P1_{i+1}$ is longer than a second tool traveling distance $L2_i$ between a second tool teaching point $P2_i$ corresponding to the first tool teaching point $P1_i$ and the subsequent second tool teaching point $P2_{i+1}$ (e.g., if the first tool 21 moves outside the second tool 22 when the first tool 21 and the second tool 22 pass curved scheduled routes $Q1_m$ and $Q2_m$), a relative speed of the first tool 21 with respect to the second tool 22 is made faster. If the first tool traveling distance $L1_i$ is shorter than the second tool traveling distance $L2_i$ (e.g., if the first tool 21 moves inside the second tool 22 when the first tool 21 and the second tool 22 pass the curved scheduled routes $Q1_m$ and $Q2_m$), the relative speed of the first tool 21 with respect to the second tool 22 is made slower. Thus, the speed at each of the teaching points $P1_i$ and $P2_i$ of the tools 21 and 22 are set. Note that, if different speeds are set for the first tool 21 and the second tool 22, one of the speeds of the two tools 21 and 22 may be made faster or slower than the other speed, or one of the tools 21 and 22 of which the tool traveling distance is longer is made faster in the speed while the speed of the shorter tool traveling distance is made slower.

In this embodiment, the scheduled route $Q2_m$ of the second tool 22 is determined based on the scheduled route $Q1_m$ of the first tool 21. That is, the first tool 21 is controlled as a master tool, while the second tool 22 is controlled as a slave tool.

The controller 3 controls operations of the first link part 25 and the second link part 26 based on the operating command containing respective information on the plurality of first tool teaching points $P1_i$ which define the scheduled route $Q1_m$ of the tip-end part 23 of the first tool 21, and the plurality of second tool teaching points $P2_i$ which are set corresponding to the plurality of first tool teaching points $P1_i$ and define the scheduled route $Q2_m$ of the tip-end part 24 of the second tool 22.

Figure 4:
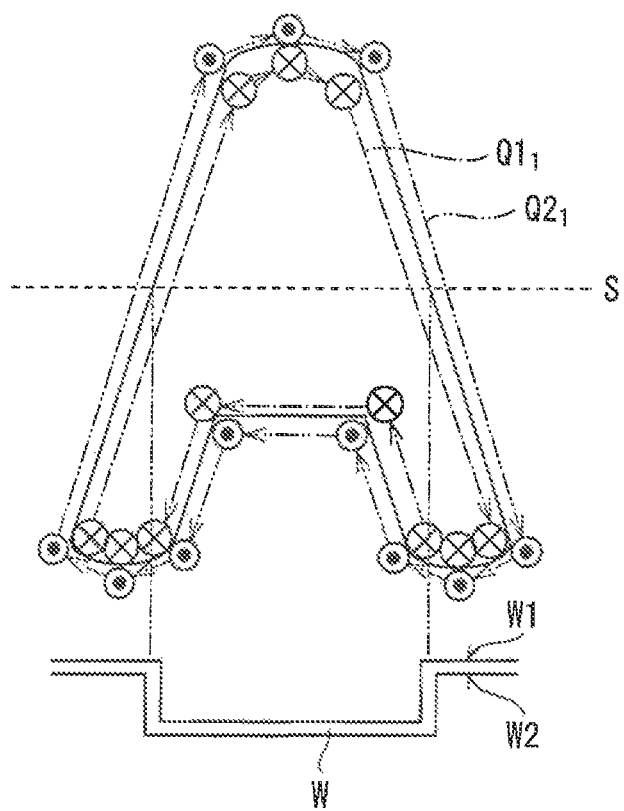
FIG. 4 is a view illustrating a procedure of carrying out incremental forming based on the three-dimensional drawing data illustrated in FIG. 2 by a machining device of this embodiment.
Figure 5:
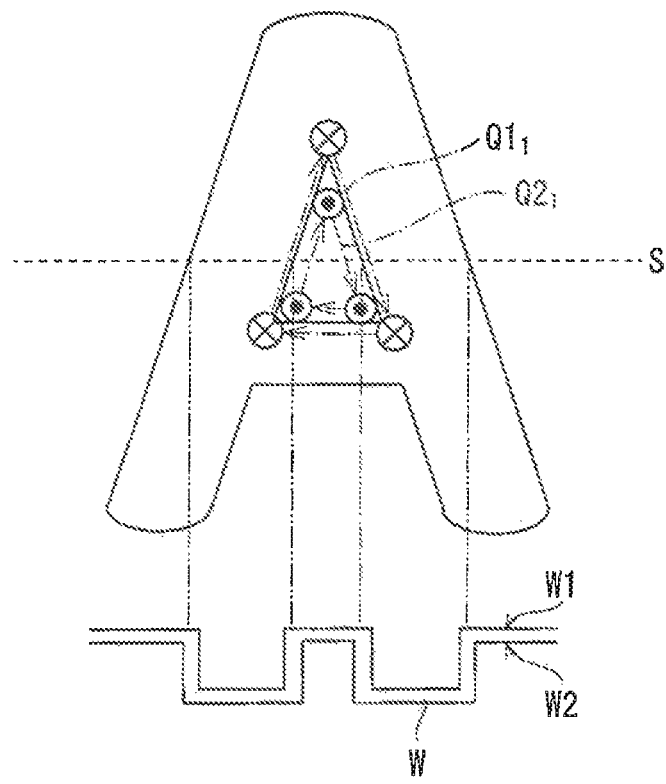
FIG. 5 is a view illustrating a procedure of carrying out the incremental forming based on the three-dimensional drawing data illustrated in FIG. 2 by the machining device of this embodiment.

FIGS. 4 and 5 are views illustrating procedures of carrying out incremental forming by the machining device of this embodiment based on the three-dimensional drawing data illustrated in FIG. 2. In each of FIGS. 4 and 5, an upper drawing illustrates a plan view and a lower drawing illustrates a cross-sectional view which illustrates a cross-sectional shape of the workpiece W at a cutting plane S of the upper drawing. As illustrated in FIG. 4, the controller 3 of the machining device 2 controls the first link part 25 based on the operating command so that the tip-end part 23 of the first tool 21 moves along a scheduled route $Q1_1$ sequentially from a teaching point $P1_1$ and then reaches a teaching point $P1_{12}$ which is at the same position as the teaching point $P1_1$ while the tip-end part 23 is pressed against the first surface W1 of the workpiece W. Further, corresponding to the movement of the tip-end part 23 of the first tool 21, the controller 3 controls the second link part 26 so that the tip-end part 24 of the second tool 22 moves along a scheduled route $Q2_1$ sequentially from a teaching point $P2_1$ and then reaches a teaching point $P2_{12}$ which is at the same position as the teaching point $P2_1$ while the tip-end part 24 is pressed against the second surface W2 of the workpiece W. Here, the scheduled route $Q1_1$ passes inside the scheduled route $Q2_1$. Thus, an area inside a perimeter edge of the character "A" of the workpiece W is formed in the shape which is projected (dented) toward the second surface W2 from other areas.

As illustrated in FIG. 5, the controller 3 of the machining device 2 then controls the first link part 25 based on the operating command so that the tip-end part 23 of the first tool 21 moves along a scheduled route $Q1_2$ sequentially from a teaching point $P1_{13}$ and then reaches a teaching point $P1_{16}$ which is at the same position as the teaching point $P1_{13}$ while the tip-end part 23 is pressed against the first surface W1 of the workpiece W. Further, corresponding to the movement of the tip-end part 23 of the first tool 21, the controller 3 controls the second link part 26 so that the tip-end part 24 of the second tool 22 moves along a scheduled route $Q2_2$ sequentially from a teaching point $P2_{13}$ and then reaches a teaching point $P2_{16}$ which is at the same position as the teaching point $P2_{13}$ while the tip-end part 24 is pressed against the second surface W2 of the workpiece W. Here, the scheduled route $Q1_2$ passes outside the scheduled route $Q2_2$. Thus, an area inside the inner circumferential edge of a triangular shape of the character "A" among the area projected toward the second surface W2 of the workpiece W in the previous process is again raised and formed so that the raised area is located substantially at the same position as the area outside the character "A" of the workpiece W. As a result, as illustrated in FIG. 3, the "A" character-shaped groove X is formed in the workpiece W.

Since in such an operating command the movement between the adjacent teaching points of one tool is a straight-line movement, when there are portions with large curvatures in the scheduled routes $Q1_m$ and $Q2_m$, it is necessary to appropriately set the teaching points in such portions (in principle, increase the number of teaching points rather than portions with smaller curvatures). On the other hand, in terms of the control of the machining device 2, machining speed becomes faster as the teaching points become less.

Thus, even if the operating command is created where the teaching points $P1_i$ and $P2_i$ for setting the scheduled routes $Q1_m$ and $Q2_m$ of the two tools 21 and 22 are set respectively so that a mutual distance $T_i$ of the corresponding teaching points $P1_i$ and $P2_i$ between the two tools 21 and 22 (i.e., a distance between the tools 21 and 22 at the teaching points $P1_i$ and $P2_i$) falls within a suitable range, the operating command may not necessarily result in high machining quality.

The inventors of the present disclosure made keen examinations of the causes, and as a result, acquired the knowledge that the distance between the tools 21 and 22 which are moving between two adjacent teaching points might not be within the suitable range, in large curvature portions of the scheduled routes $Q1_m$ and $Q2_m$. Thus, the inventors of the present disclosure verifies whether the distance between the tools 21 and 22 at the position of a midpoint of two adjacent teaching points (inter-midpoint distance) falls within the suitable range, and reach the method of verifying the operating command of the present disclosure which verifies whether the positions and the number of the teaching points set for the operating command are suitable.

Below, the method of verifying the operating command in this embodiment is described more concretely. In this embodiment, an operating-command verification program is stored in the memory part 11 of the computer terminal 8, and the verification program is configured to cause the computer terminal 8 to execute the following operating-command verification processing.

Figure 6:
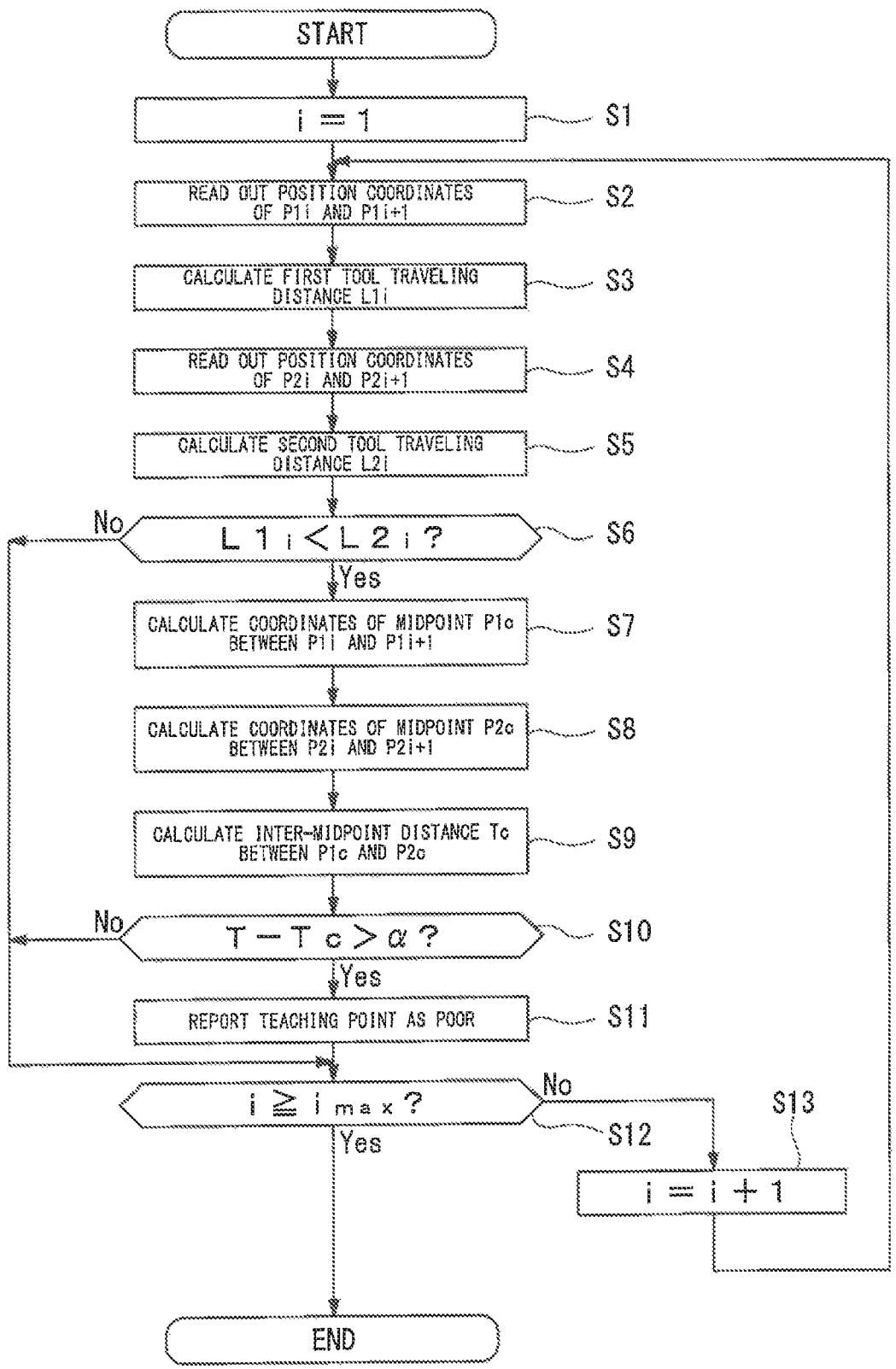
FIG. 6 is a flowchart illustrating a flow of operating-command verification processing of this embodiment.
Figure 7:
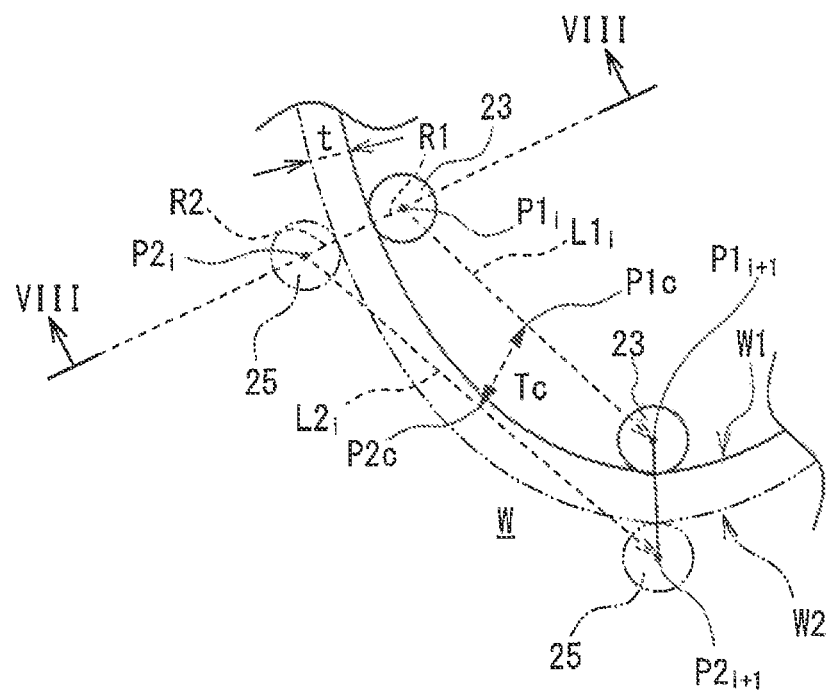
FIG. 7 is a view illustrating the operating-command verification processing of this embodiment.
Figure 8:
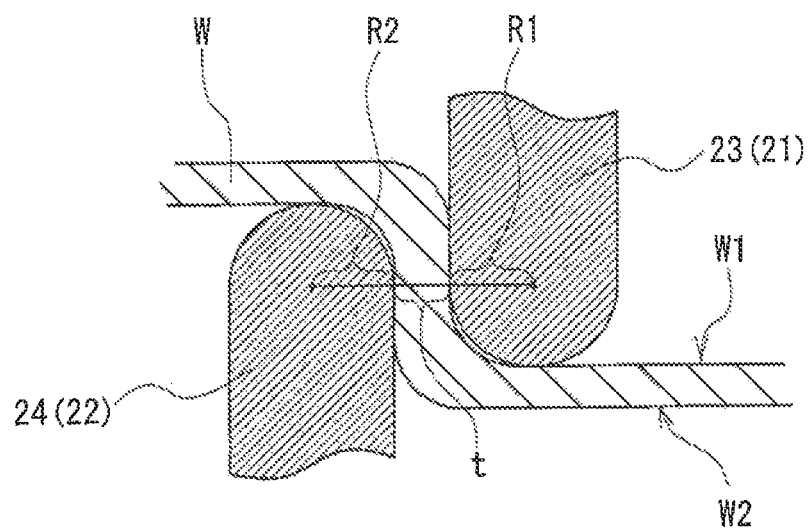
FIG. 8 is a cross-sectional view taken along a line VIII-VIII of FIG. 7.

FIG. 6 is a flowchart illustrating a flow of the operating-command verification processing of this embodiment. FIGS. 7 and 8 are views illustrating the operating-command verification processing of this embodiment. FIG. 7 is a plan view illustrating two adjacent first tool teaching points $P1_i$ and $P1_{i+1}$ in large curvature portions of the scheduled routes $Q1_m$ and $Q2_m$, and two adjacent second tool teaching points $P2_i$ and $P2_{i+1}$ corresponding to the first tool teaching points $P1_i$ and $P1_{i+1}$. FIG. 8 is a cross-sectional view taken along a line VIII-VIII of FIG. 7.

Note that, below, although a mode in which the positions of the adjacent teaching points changes in directions parallel to the flat surfaces of the workpiece W is described as illustrated in FIG. 7, a mode in which the positions of the adjacent teaching points changes in directions perpendicular to the flat surfaces of the workpiece W is similar.

First, the operation part 10 of the computer terminal 8 sets a flag "i" indicative of a teaching point number to an initial value "1" as initial setting, and then stores it in the memory part 11 (Step S1). Next, the operation part 10 reads out the position coordinates of the first tool teaching points $P1_i$ and $P1_{i+1}$ corresponding to the flags i and i+1 from the memory part 11 (Step S2). The operation part 10 calculates the first tool traveling distance $L1_i$ between the adjacent first tool teaching points $P1_i$ and $P1_{i+1}$ (Step S3).

Similarly, the operation part 10 reads out the position coordinates of the second tool teaching points $P2_i$ and $P2_{i+1}$ corresponding to the flags i and i+1 from the memory part 11 (Step S4). The operation part 10 calculates the second tool traveling distance $L2_i$ between the adjacent second tool teaching points $P2_i$ and $P2_{i+1}$ (Step S5). Steps S1-S5 are referred to as an inter-teaching-point traveling distance calculation step.

The operation part 10 executes a traveling distance comparison step in which the first tool traveling distance $L1_i$ is compared with the second tool traveling distance $L2_i$ (Step S6). As a result, if the second tool traveling distance $L2_i$ is greater than the first tool traveling distance $L1_i$ (Yes at Step S6), the operation part 10 performs a teaching point poor determination step (Steps S7-S11) described later, and if the second tool traveling distance $L2_i$ is less than the first tool traveling distance $L1_i$ (No at Step S6), the operation part 10 does not perform the teaching point poor determination step.

According to this, the teaching point poor determination step is executed for the two adjacent teaching points of which the traveling distance between the teaching points of the second tool 22 (second tool traveling distance $L2_i$) is greater than the traveling distance between the teaching points of the first tool 21 (first tool traveling distance $L1_i$). That is, it is verified whether the inter-midpoint distance is set appropriately only for portions where the scheduled route $Q2_m$ of the second tool 22 which is a subordinate scheduled route of the scheduled route $Q1_m$ of the first tool 21 makes a large turn around the scheduled route $Q1_m$ of the first tool 21. Therefore, the computational complexity and the computation time are reducible by narrowing down the portions to be verified to portions where the distance between the scheduled routes may not fall within a tolerance range, and carrying out the verification of the narrowed-down portions.

If the second tool traveling distance $L2_i$ is greater than the first tool traveling distance $L1_i$ (Yes at Step S6), the operation part 10 calculates coordinates of a midpoint $P1c$ between the adjacent first tool teaching points $P1_i$ and $P1_{i+1}$ (Step S7). Similarly, the operation part 10 calculates coordinates of a midpoint $P2c$ between the second tool teaching points $P2_i$ and $P2_{i+1}$ corresponding to the first tool teaching points $P1_i$ and $P1_{i+1}$ (Step S8). Steps S7 and S8 are referred to as a midpoint coordinates calculation step.

Further, the operation part 10 executes a distance calculation step between midpoints in which an inter-midpoint distance Tc between a midpoint $P1c$ and a midpoint $P2c$ is calculated based on coordinates of the midpoint $P1c$ of the first tool teaching points and coordinates of the midpoint $P2c$ of the second tool teaching points corresponding to the coordinates of the midpoint $P1c$ (Step S9). Then, the operation part 10 executes a determination step in which the inter-midpoint distance Tc is determined whether is within a tolerance range which is set based on a given reference value Tth (Step S10).

In this embodiment, the tolerance range is defined based on a radius R1 of the tip-end part 23 of the first tool 21, a radius R2 of the tip-end part 24 of the second tool 22, and a plate thickness "t" of the workpiece W. As illustrated in FIGS. 7 and 8, if performing the incremental forming by using the two tools 21 and 22, the tip-end part 23 of the first tool 21 and the tip-end part 24 of the second tool 22 are necessary to be in a state where they pinch the workpiece W therebetween so as to press the workpiece W from both sides. Each teaching point is set as coordinates of the center of each of the tip-end parts 23 and 24 of the tools 21 and 22 (the central point of the hemisphere). Thus, an inter-teaching-point distance T between the first tool teaching point $P1_i$ and the second tool teaching point $P2_i$ corresponding to the first tool teaching point $P1_i$ are set based on T=R1+R2+t. Similarly, the reference value Tth of the inter-midpoint distance Tc is set based on T=R1+R2+t.

By defining the tolerance range based on such a reference value Tth, it can be determined easily whether the inter-midpoint distance Tc is a suitable distance when the two tools 21 and 22 pinch and press the workpiece W therebetween.

For example, the operation part 10 determines in the determination step whether a difference between the inter-midpoint distance Tc and the inter-teaching-point distance T (T−Tc) is greater than an acceptable value α (T−Tc>α). That is, if the inter-midpoint distance Tc becomes shorter than the inter-teaching-point distance T even when the acceptable value α is taken into consideration (in a case of Tc<T−α), the operation part 10 determines that the inter-midpoint distance Tc is unacceptably short.

Thus, if the inter-midpoint distance Tc is determined to be out of the given tolerance range (Yes at Step S10), the operation part 10 executes a teaching point poor reporting step in which the corresponding first tool teaching points $P1_i$ and $P1_{i+1}$, and the corresponding second tool teaching points $P2_i$ and $P2_{i+1}$ are reported as poor (Step S11). In the teaching point poor reporting step, the computer terminal 8 reports to the report part 13 the teaching point(s) which is determined to be poor.

The teaching point(s) reported may be both of the two adjacent teaching points as described above, or may be either one of the two teaching points. Moreover, the teaching point(s) reported may be either one of the first tool teaching point $P1_i$ and the second tool teaching point $P2_i$. Moreover, instead of reporting the teaching point(s), a line segment between the two adjacent teaching points (corresponding portions of the scheduled routes $Q1_m$, and $Q2_m$)) may be reported. The reporting mode is not limited in particular, and for example, a number which is assigned to the teaching point may be reported, or corresponding teaching points or corresponding portions of the scheduled routes $Q1_m$ and $Q2_m$ may be displayed on a three-dimensional drawing so as to be changed in color or blinked.

Moreover, if the computer terminal 8 is connected with a three-dimensional drawing data creating device (not illustrated), such as a CAM device, which creates the three-dimensional drawing data, a teaching point poor reporting signal indicative of the teaching point determined to be poor may be transmitted to the three-dimensional drawing data creating device from the computer terminal 8.

On the other hand, if the inter-midpoint distance Tc is determined to be within the given tolerance range (No at Step S10), the operation part 10 determines that the corresponding first tool teaching point $P1_{i+1}$ and the corresponding second tool teaching point $P2_{i+1}$ are suitable and, thus it does not execute the teaching point poor reporting step.

After the teaching point poor determination step at the read-out teaching points, the operation part 10 determines whether the flag "i" is the maximum value $i_{max}$ of the number of the teaching point which is assigned thereto in the three-dimensional drawing data (Step S12). If the flag "i" is not the maximum value $i_{max}$ (No at Step S12), the operation part 10 adds "1" to the flag "i" (Step S13), and performs verification processing for a new teaching point. If all the teaching points have been verified (Yes at Step S12), the operation part 10 ends the verification processing.

Note that, like the example illustrated in FIGS. 2 to 5, if there is a portion without adjacent teaching points (between the first tool teaching points $P1_{12}$ and $P1_{13}$, and between the second tool teaching points $P2_{12}$ and $P2_{13}$), the determination result may be ignored, or the determination itself may not be performed (the teaching points at which the teaching point poor determination step is not performed may be stored in the memory part 11 beforehand, and the operation part 10 does not perform the teaching point poor determination step at the stored teaching points).

According to the above configuration, it is determined whether the inter-midpoint distance Tc between the midpoint P1c between the two adjacent teaching points $P1_i$ and $P1_{i+1}$ among the plurality of first tool teaching points, and the midpoint P2c between the two adjacent teaching points $P2_i$ and $P2_{i+1}$ corresponding to the two adjacent first tool teaching points $P1_i$ and $P1_{i+1}$ among the plurality of second tool teaching points is within the given tolerance range. Thus, it is not only verifiable whether the distance T between the teaching point $P1_i$ of the first tool 21 and the teaching point $P2_i$ of the second tool 22 is set appropriately, but it is also verifiable whether the distance between the entire scheduled route $Q1_m$ of the first tool 21 and the entire scheduled route $Q2_m$ of the second tool 22 is set appropriately. Therefore, the operating command with high machining quality can be created.

If the teaching points $P1_{i+1}$ and $P2_{i+1}$ which are determined to be poor are reported, an operator is capable of operating the three-dimensional drawing data creating device or the computer terminal 8 to arrange new teaching points between the first tool teaching points $P1_i$ and $P1_{i+1}$, and between the second tool teaching points $P2_i$ and $P2_{i+1}$, which are reported in three-dimensional drawing data. After the new teaching points are arranged, the operating-command verification processing is again performed, and it is repeated until there is no teaching point determined to be poor. Thus, the scheduled routes $Q1_m$ and $Q2_m$ are set more appropriately.

As described above, although the embodiment of the present disclosure is described, the present disclosure is not limited to the above embodiment, and various improvements, changes, and modifications are possible without departing from the spirit of the present disclosure.

For example, in the above embodiment, although the inter-teaching-point traveling distance calculation step and the traveling distance comparison step are performed before the teaching point poor determination step, these processings are not necessarily required, and the teaching point poor determination step may be performed for all the teaching points. That is, Steps S3, S5 and S6 among the steps illustrated in FIG. 6 may be eliminated.

The radius R1 of the tip-end part 23 of the first tool 21 and the radius R2 of the tip-end part 24 of the second tool 22 may be the same or different from each other. Moreover, the shape of the tools 21 and 22 may not necessarily be hemispherical.

It is apparent for a person skilled in the art the many improvements and other embodiments of the present disclosure are possible from the above description. Therefore, the above description is to be interpreted only as illustration, and it is provided in order to teach a person skilled in the art the best mode which implements the present disclosure. The details of the structure and/or function of the present disclosure may be changeable substantially without departing from the spirit of the present disclosure.

INDUSTRIAL APPLICABILITY

The method of verifying the operating command, the method of controlling the machining device, and the recording medium recorded with the operating-command verification program of the present disclosure are useful for creating the operating command with high machining quality.

DESCRIPTION OF REFERENCE CHARACTERS

1 Machining System
2 Machining Device
3 Controller (Control Device)
8 Computer Terminal
9 Input Part
10 Operation Part 11 Memory Part
12 Output Part
13 Report Part
21 First Tool
22 Second Tool
23 Tip-end Part of First Tool
24 Tip-end Part of Second Tool
25 First Link Part
26 Second Link Part
W Workpiece
W1 First Surface
W2 Second Surface

What is claimed is:

1. A machining method using a machining device configured to perform incremental forming using a first tool and a second tool, the machining method comprising:
pressing a tip end of the first tool against a first surface of a workpiece disposed at a given location;
pressing a tip end of the second tool against a second surface of the workpiece, the second surface being located opposite from the first surface of the workpiece;
moving the first tool based on a plurality of first tool teaching points while maintaining the first tool pressed against the workpiece, the plurality of first tool teaching points defining a scheduled route of the tip end of the first tool;
moving the second tool based on a plurality of second tool teaching points while maintaining the second tool pressed against the workpiece, the plurality of second tool teaching points being set corresponding to the plurality of first tool teaching points and defining a scheduled route of the tip end of the second tool;
calculating coordinates of a midpoint between one of the plurality of first tool teaching points and a subsequent first tool teaching point, and calculating coordinates of a midpoint between one of the plurality of second tool teaching points that corresponds to the one first tool teaching point and a subsequent second tool teaching point;
calculating an inter-midpoint distance between the midpoint of the one and the subsequent first tool teaching points and the midpoint of the corresponding one and the subsequent second tool teaching points;
determining whether the calculated inter-midpoint distance is determined to be outside of the predetermined tolerance range; and
when the inter-midpoint distance is determined to be outside of the predetermined tolerance range, notifying that the corresponding one and the subsequent first tool teaching points and the one and the subsequent second tool teaching points as poor.

2. The method of claim 1, wherein:
the scheduled route of the second tool is defined based on the scheduled route of the first tool,
the method further comprises:
calculating a first tool traveling distance between the one of the plurality of first tool teaching points and the subsequent first tool teaching points, and calculating a second tool traveling distance between the one of the plurality of second tool teaching points corresponding to the one first tool teaching point and the subsequent second tool teaching point; and
comparing the first tool traveling distance with the second tool traveling distance,
wherein the determining that the inter-midpoint distance is outside of the predetermined tolerance range, such that the teaching point is poor, occurs when the second tool traveling distance is greater than the first tool traveling distance, and determining the teaching point is not poor occurs when the second tool traveling distance is less than the first tool traveling distance.

3. The method of claim 2, wherein:
the tip end of the first tool and the tip end of the second tool are formed in a hemispherical shape, respectively, and
the tolerance range is defined based on a radius of the tip end of the first tool, a radius of the tip end of the second tool, and a plate thickness of the workpiece.

4. The method of claim 1, wherein:
the tip end of the first tool and the tip end of the second tool are formed in a hemispherical shape, respectively, and
the tolerance range is defined based on a radius of the tip end of the first tool, a radius of the tip end of the second tool, and a plate thickness of the workpiece.

5. A non-transitory computer readable recording medium storing an operating-command verification program for a machining system including a machining device configured to perform incremental forming, and a control device configured to control operation of the machining device based on an operating command, the machining device including:
a first tool of which a tip-end part is arranged toward a first surface of a plate-like workpiece in a state where the workpiece is disposed at a given location;
a first link part configured to hold the first tool and move the first tool with respect to the workpiece;
a second tool of which a tip-end part is arranged toward a second surface opposite from the first surface of the workpiece; and
a second link part configured to hold the second tool and move the second tool with respect to the workpiece, independently from the first tool,
wherein the incremental forming is performed so that the tip-end part of the first tool and the tip-end part of the second tool are pressed against the workpiece,
wherein the control device controls operations of the first link part and the second link part based on the operating command containing information on a plurality of first tool teaching points that define a scheduled route of the tip-end part of the first tool, and a plurality of second tool teaching points that are set corresponding to the plurality of first tool teaching points and define a scheduled route of the tip-end part of the second link, and
wherein the operating-command verification program causes a computer to execute a teaching point poor determination comprising:
calculating coordinates of a midpoint between one of the plurality of first tool teaching points and a subsequent first tool teaching point, and calculating coordinates of a midpoint between one of the plurality of second tool teaching points that corresponds to the one first tool teaching point and a subsequent second tool teaching point;
calculating an inter-midpoint distance between the midpoint of the one and the subsequent first tool teaching points and the midpoint of the corresponding one and the subsequent second tool teaching points;
determining whether the inter-midpoint distance is within a predetermined tolerance range; and
when the inter-midpoint distance is determined to be outside of the predetermined tolerance range, notifying that the one and the subsequent first tool teaching points and the one and the subsequent second tool teaching points as poor.

6. A machining system comprising:
a machining device configured to perform incremental forming;
a control device configured to control operation of the machining device based on an operating command; and
a computer configured to create the operating command,
wherein the machining device includes:
- a first tool of which a tip end is arranged toward a first surface of a workpiece in a state where the workpiece is disposed at a given location;
- a first link part configured to hold the first tool and move the first tool with respect to the workpiece;
- a second tool of which a tip end is arranged toward a second surface opposite from the first surface of the workpiece; and
- a second link part configured to hold the second tool and move the second tool with respect to the workpiece, independently from the first tool, wherein the incremental forming is performed so that the tip end of the first tool and the tip end of the second tool are pressed against the workpiece,
wherein the control device controls operations of the first link part and the second link part based on the operating command containing information on a plurality of first tool teaching points that define a scheduled route of the tip end of the first tool, and a plurality of second tool teaching points that are set corresponding to the plurality of first tool teaching points and define a scheduled route of the tip end of the second link, and
wherein the computer executes a teaching point poor determination including:
- calculating coordinates of a midpoint between one of the plurality of first tool teaching points and a subsequent first tool teaching point, and calculating coordinates of a midpoint between one of the plurality of second tool teaching points that corresponds to the one first tool teaching point and a subsequent second tool teaching point;
- calculating an inter-midpoint distance between the midpoint of the one and the subsequent first tool teaching points and the midpoint of the corresponding one and the subsequent second tool teaching points;
- determining whether the inter-midpoint distance is within a predetermined tolerance range; and
- when the inter-midpoint distance is determined to be outside of the predetermined tolerance range, notifying that the one and the subsequent first tool teaching points and the one and the subsequent second tool teaching points as poor.

* * * * *